United States Patent
Henry et al.

(10) Patent No.: US 8,276,032 B2
(45) Date of Patent: Sep. 25, 2012

(54) DETECTION OF UNCORRECTABLE RE-GROWN FUSES IN A MICROPROCESSOR

(75) Inventors: G. Glenn Henry, Austin, TX (US);
Darius D. Gaskins, Austin, TX (US);
Stephan Gaskins, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 360 days.

(21) Appl. No.: 12/719,260

(22) Filed: Mar. 8, 2010

(65) Prior Publication Data
US 2011/0035616 A1    Feb. 10, 2011

Related U.S. Application Data

(60) Provisional application No. 61/232,247, filed on Aug. 7, 2009.

(51) Int. Cl.
*G01R 31/28* (2006.01)
(52) U.S. Cl. ....................................... 714/732
(58) Field of Classification Search .................. 714/710, 714/711, 718, 719, 763
See application file for complete search history.

(56) References Cited

U.S. PATENT DOCUMENTS

| | | | |
|---|---|---|---|
| 5,134,585 A * | 7/1992 | Murakami et al. | 365/200 |
| 5,206,583 A * | 4/1993 | Dawson et al. | 324/750.3 |
| 5,461,328 A | 10/1995 | Devereaux et al. | |
| 5,517,455 A | 5/1996 | McClure et al. | |
| 5,889,679 A | 3/1999 | Henry et al. | |
| 5,917,764 A * | 6/1999 | Ohsawa et al. | 365/200 |
| 5,946,497 A | 8/1999 | Lee et al. | |
| 5,973,977 A | 10/1999 | Boyd et al. | |
| 6,386,456 B1 * | 5/2002 | Chen et al. | 235/487 |
| 6,622,208 B2 | 9/2003 | North | |
| 6,768,694 B2 | 7/2004 | Anand et al. | |
| 6,876,594 B2 | 4/2005 | Griesmer et al. | |
| 6,915,476 B2 | 7/2005 | Morino et al. | |
| 7,030,641 B1 | 4/2006 | Tang et al. | |
| 7,035,158 B2 | 4/2006 | Kozuka | |
| 7,069,484 B2 * | 6/2006 | Beffa | 714/718 |
| 7,139,944 B2 * | 11/2006 | Barbour et al. | 714/718 |
| 7,206,988 B1 * | 4/2007 | Solt et al. | 714/763 |

(Continued)

OTHER PUBLICATIONS

DeVries, Ann et al., "A logical Approach to NVM Integration in SOC Design." EDN Voice of the Engineer. Jan. 18, 2007 Issue 2. pp. 1-6.

(Continued)

*Primary Examiner* — James C Kerveros
(74) *Attorney, Agent, or Firm* — E. Alan Davis; James W. Huffman

(57) ABSTRACT

A microprocessor includes a first plurality of fuses, a predetermined number of which are selectively blown. Control values are provided from the first plurality of fuses to circuits of the microprocessor to control operation of the microprocessor. The microprocessor also includes a second plurality of fuses, blown with the predetermined number of the first plurality of fuses that are blown. In response to being reset, the microprocessor is configured to: read the first plurality of fuses and count a number of them that are blown; read the predetermined number from the second plurality of fuses; compare the counted number with the predetermined number read from the second plurality of fuses; and prevent itself from fetching and executing user program instructions if the number counted from reading the first plurality of fuses does not equal the predetermined number read from the second plurality of fuses.

21 Claims, 10 Drawing Sheets

U.S. PATENT DOCUMENTS

| | | | |
|---|---|---|---|
| 7,222,274 B2 * | 5/2007 | Combs et al. | 714/721 |
| 7,236,007 B1 * | 6/2007 | Chang | 326/39 |
| 7,266,025 B2 | 9/2007 | Nagai et al. | |
| 7,274,615 B2 | 9/2007 | Nakagawa et al. | |
| 7,401,270 B2 * | 7/2008 | Hummler | 714/710 |
| 7,411,851 B2 * | 8/2008 | Ueda | 365/225.7 |
| 7,436,718 B2 | 10/2008 | Tanaka et al. | |
| 7,458,002 B2 | 11/2008 | Fischer et al. | |
| 7,484,140 B2 * | 1/2009 | Pelley et al. | 714/718 |
| 7,489,180 B2 * | 2/2009 | Marshall | 327/525 |
| 7,551,470 B2 * | 6/2009 | Erickson et al. | 365/96 |
| 7,729,163 B2 | 6/2010 | Ramani et al. | |
| 7,817,455 B2 * | 10/2010 | Fredeman et al. | 365/96 |
| 7,895,482 B2 * | 2/2011 | Fischer et al. | 714/710 |
| 7,966,537 B2 * | 6/2011 | Bonaccio et al. | 714/731 |
| 7,978,493 B1 | 7/2011 | Tan et al. | |
| 8,077,531 B2 | 12/2011 | Song et al. | |
| 8,127,184 B2 * | 2/2012 | Mohammad | 714/723 |
| 2003/0110349 A1 | 6/2003 | Zimmerman et al. | |
| 2003/0131210 A1 | 7/2003 | Mueller | |
| 2005/0122800 A1 | 6/2005 | Morino et al. | |
| 2006/0215433 A1 | 9/2006 | Fischer et al. | |
| 2008/0256336 A1 | 10/2008 | Henry et al. | |
| 2008/0316789 A1 | 12/2008 | Fredeman et al. | |
| 2009/0031108 A1 | 1/2009 | Henry et al. | |
| 2009/0296511 A1 | 12/2009 | Henry et al. | |

OTHER PUBLICATIONS

Shirvani, Philip P. et al., "Software-Implemented EDAC Protection Against SEUs." IEEE Transactions on Reliability. vol. 49, No. 3, Sep. 2000. pp. 273-284.

* cited by examiner

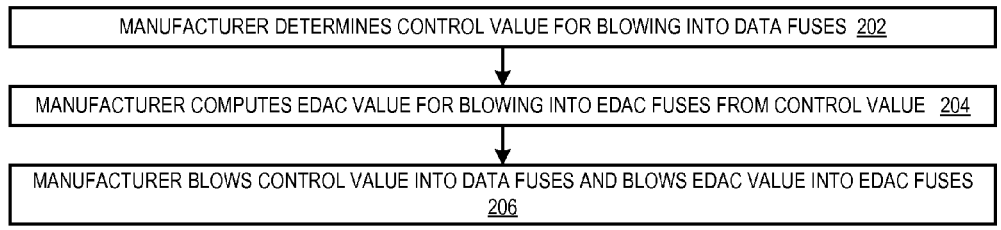
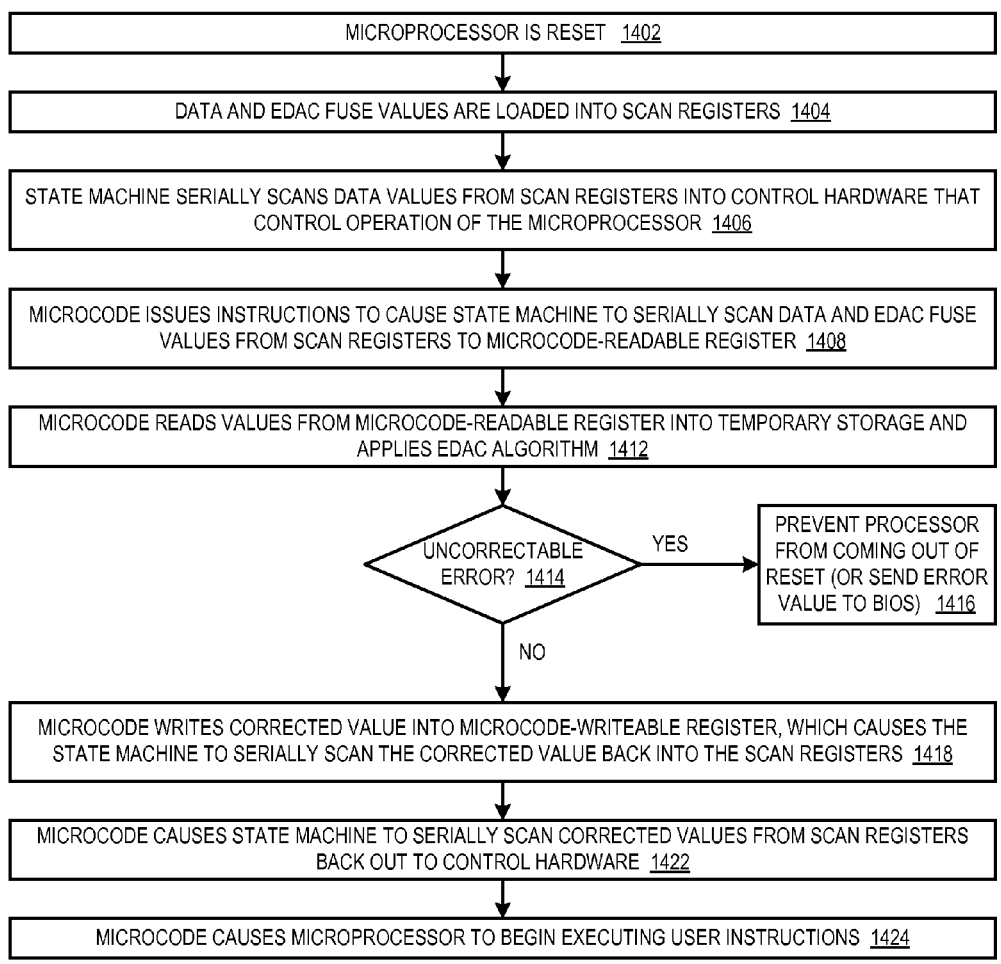

DETECTION OF UNCORRECTABLE RE-GROWN FUSES IN A MICROPROCESSOR

CROSS REFERENCE TO RELATED APPLICATION(S)

This application claims priority based on U.S. Provisional Application, Ser. No. 61/232,247 (CNTR.2492), filed Aug. 7, 2009, entitled METHOD FOR DETECTING UNCORRECTABLE RE-GROWN FUSES IN A MICROPROCESSOR, which is hereby incorporated by reference in its entirety.

This application is related to the following U.S. Non-Provisional Applications, each of which is incorporated by reference herein in its entirety, and each of which is subject to an obligation of assignment to common assignee VIA Technologies, Inc.:

| Ser. No. | Filing Date | Title |
| --- | --- | --- |
| 12/609,207 (CNTR.2490) | Oct. 30, 2009 | DETECTION AND CORRECTION OF FUSE RE-GROWTH IN A MICROPROCESSOR |
| 12719291 (CNTR.2493) | Mar. 8, 2010 | USER-INITIATABLE METHOD FOR DETECTING RE-GROWN FUSES WITHIN A MICROPROCESSOR |
| 12719307 (CNTR.2494) | Mar. 8, 2010 | DETECTION AND CORRECTION OF FUSE RE-GROWTH IN A MICROPROCESSOR |
| 12719322 (CNTR.2495) | Mar. 8, 2010 | DETECTION OF FUSE RE-GROWTH IN A MICROPROCESSOR |

FIELD OF THE INVENTION

The present invention relates in general to the field of microprocessors, and particularly to the use of fuses in microprocessors.

BACKGROUND OF THE INVENTION

Modern microprocessors include fuses that may be selectively blown during manufacturing of the microprocessor. The fuses may be selectively blown with control values that are read from the fuses to control operation of the microprocessor. Normally, when a non-blown fuse is read it returns a binary zero, and when a blown fuse is read it returns a binary one (although, of course, the convention could be reversed). However, the present inventors have observed microprocessors operating in the field that have blown fuses that change their value; that is, they return the incorrect binary zero value, in some cases intermittently, even though they returned the correct binary one value when tested during manufacturing. This is referred to as a fuse "re-growing," or fuse "re-growth." That is, a blown fuse may be physically altered by continual operation of the microprocessor such that when read, the fuse returns its non-blown value rather than its blown value. The consequences of this fuse re-growth can be disastrous to the subsequent operation of the microprocessor, depending upon the particular use of the value in the re-grown fuse. Additionally, the symptoms caused by a re-grown fuse can be very difficult to detect during failure analysis.

U.S. patent application Ser. No. 12/609,207 (CNTR.2490), describes a solution to this problem that employs EDAC fuses. This is a solution for fuses that are correctable. That is, most of the fuses are used to populate control hardware that is written by the microcode. Specifically, the microcode reads the values from the fuses, corrects the values using the EDAC fuses if necessary, and then writes the corrected values to the hardware, e.g., model specific register (MSR), feature control register (FCR), patch hardware, etc. However, some of the fuses are not correctable by microcode. That is, when the chip powers up, the values in the uncorrectable fuses are scanned directly to hardware registers without giving the microcode the ability to correct them using the EDAC technique. Examples are cache correction fuses and PLL adjustment fuses. In one embodiment of the microprocessor, microcode cannot read the uncorrectable fuses.

Therefore, what is needed is a way to determine whether the uncorrectable fuses have re-grown.

BRIEF SUMMARY OF INVENTION

In one aspect the present invention provides a microprocessor. The microprocessor includes a first plurality of fuses, a predetermined number of which are selectively blown. Control values are provided from the first plurality of fuses to circuits of the microprocessor to control operation of the microprocessor. The microprocessor also includes a second plurality of fuses, blown with the predetermined number of the first plurality of fuses that are blown. In response to being reset, the microprocessor is configured to: read the first plurality of fuses and count a number of them that are blown; read the predetermined number from the second plurality of fuses; compare the counted number with the predetermined number read from the second plurality of fuses; and prevent itself from fetching and executing user program instructions if the number counted from reading the first plurality of fuses does not equal the predetermined number read from the second plurality of fuses.

In another aspect, the present invention provides a method for operating a microprocessor. The method includes reading a first plurality of fuses, wherein a predetermined number of the first plurality of fuses are selectively blown, wherein control values are provided from the first plurality of fuses to circuits of the microprocessor to control operation of the microprocessor. The method also includes counting a number of the first plurality of fuses that are blown. The method also includes reading a predetermined number from a second plurality of fuses, wherein the second plurality of fuses are blown with the predetermined number of the first plurality of fuses that are blown. The method also includes comparing the counted number with the predetermined number read from the second plurality of fuses. The method also includes preventing the microprocessor from fetching and executing user program instructions if the number counted from reading the first plurality of fuses does not equal the predetermined number read from the second plurality of fuses.

In yet another aspect, the present invention provides a method for manufacturing a microprocessor having a capability to detect an incorrect control value provided by a first plurality of fuses of the microprocessor to circuits of the microprocessor during operation of the microprocessor to control operation thereof, the control value being incorrect because a blown one or more of the first plurality of fuses is providing its non-blown value rather than its blown value. The method includes determining the control value. The method also includes counting a number of the first plurality of fuses to be blown to create the control value in the first plurality of fuses. The method also includes blowing the control value into the first plurality of fuses. The method also includes blowing into a second plurality of fuses of the microprocessor the number of the first plurality of fuses blown to create the control value.

In yet another aspect, the present invention provides a computer program product encoded in at least one computer readable medium for use with a computing device, the computer program product comprising computer readable program code embodied in said medium, for specifying a microprocessor. The computer readable program code includes first program code for specifying a first plurality of fuses, a predetermined number of which are selectively blown, wherein control values are provided from the first plurality of fuses to circuits of the microprocessor to control operation of the microprocessor. The computer readable program code also includes second program code for specifying a second plurality of fuses, blown with the predetermined number of the first plurality of fuses that are blown. In response to being reset, the microprocessor is configured to: read the first plurality of fuses and count a number of them that are blown; read the predetermined number from the second plurality of fuses; compare the counted number with the predetermined number read from the second plurality of fuses; and prevent itself from fetching and executing user program instructions if the number counted from reading the first plurality of fuses does not equal the predetermined number read from the second plurality of fuses.

BRIEF DESCRIPTION OF THE DRAWINGS

FIG. 13 is a flowchart illustrating operation of steps performed to manufacture the microprocessor of FIG. 12.

FIG. 14 is a flowchart illustrating operation of the microprocessor of FIG. 12.

DETAILED DESCRIPTION OF THE INVENTION

Embodiments are described herein that provide microcode of the microprocessor the ability to read the uncorrectable fuses. When a part is manufactured, the number of the uncorrectable fuses that are going to blown in the part is determined. For example, assume there are 1000 uncorrectable fuses, and 147 of them are to be blown. Next, that number is taken and blown as a signature somewhere in a set of the fuses that are correctable by microcode via the EDAC technique described above. When the microprocessor is reset and the reset microcode runs, it reads all the uncorrectable fuses to count how many are blown, and then compares that number with the signature read from the correctable fuses (after the correctable fuses are corrected, if necessary). If the counted number and the signature are not equal, the part is not allowed to come out of reset, or alternatively, the error is posted to a software-readable register.

Figure 1:
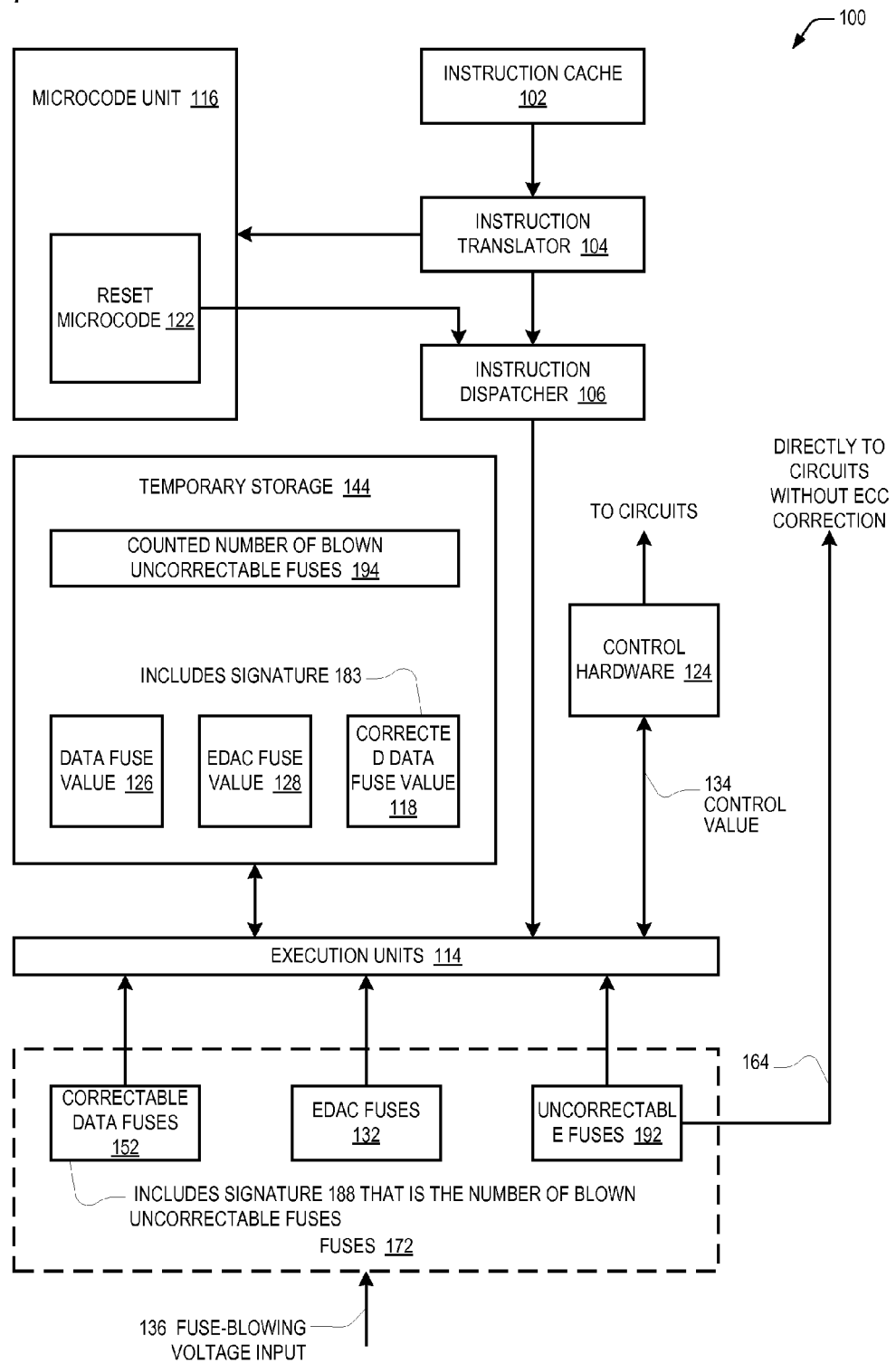
FIG. 1 is a block diagram illustrating a microprocessor.

Referring now to FIG. 1, a block diagram illustrating a microprocessor 100 is shown. The microprocessor 100 includes fuses 172. In one embodiment, the fuses 172 are polysilicon fuses, although other fuse technologies, such as metal fuses, may be employed within the embodiments described herein. The fuses 172, although physically the same, are logically allocated as two separate groups, namely error detection and correction (EDAC) fuses 132 and data fuses, and the data fuses are further separated into correctable data fuses 152 and uncorrectable data fuses 192. Whether a particular fuse 172 is allocated as a data fuse or as an EDAC fuse 132, depends upon the particular EDAC algorithm employed by the manufacturer of the microprocessor 100, as described herein.

The fuses 172 are configured such that the manufacturer of the microprocessor 100 may supply a prescribed voltage on an input 136 to the microprocessor 100 in order to selectively blow the fuses 172 on an individual basis. In one embodiment, the manufacturer specifies which fuse 172 to blow via a JTAG scan interface. In one embodiment, one side of each fuse 172 is connected to ground and the other side of the fuse is connected to an active device, such as to an input of a transistor, which is readable by the microprocessor 100. Thus, if a fuse 172 is non-blown, it will conduct and be read as a low voltage (binary zero by convention); whereas, if a fuse 172 is blown, it will not conduct and be read as a high voltage (binary one by convention). Other embodiments are contemplated in which the opposite binary value convention is employed.

Although the fuses 172 may be individually blown during manufacturing and each fuse 172 constitutes a single binary digit (bit), logically the correctable data fuses 152 are viewed as a single entity having a single collective value blown into them, and the EDAC fuses 132 are viewed as a single entity having a single collective value blown into them. The manufacturer computes the single collective value blown into the EDAC fuses 132 using an EDAC algorithm that takes the single value blown into the correctable data fuses 152 as its input, as described in more detail herein.

The microprocessor 100 also includes control hardware 124. The control hardware 124 is configured to receive and store a control value 134 and to provide the control value 134 to various circuits of the microprocessor 100 for controlling operation of the microprocessor 100. The control hardware 124 may include, but is not limited to, the following: microcode patch hardware used for patching microcode (in one embodiment, the patch hardware is substantially similar to that described in U.S. patent application Ser. No. 11/782,105 (CNTR.2412), filed on Jul. 24, 2007, entitled CONFIGURABLE FUSE MECHANISM FOR IMPLEMENTING MICROCODE PATCHES, which is hereby incorporated by reference in its entirety for all purposes); feature control registers of the microprocessor 100 used to enable or disable and/or indicate the presence or absence of features or functional units of the microprocessor 100, such as a floating point unit (FPU), an MMX unit, an SSE unit, caches and translation-lookaside buffers (TLBs), a call/return stack, a random number generator, an encryption engine, a fused-multiply-add instruction feature, microcode patch-related features, virtual machine extensions (VMX), performance monitoring features, processor stepping and family information, prefetching features, branch prediction features, features related to page table walking, and power management features; configuration registers of the microprocessor 100, for controlling the frequency of one or more clock signals within the microprocessor 100 or controlling voltage levels within the microprocessor 100, among other things.

In a conventional microprocessor, the values are read from fuses and written to the control hardware without the benefit of error detection and correction. As discussed above, if a blown fuse has re-grown such that it will conduct and incorrectly be read as a zero instead of a one, there is a high likelihood that the conventional microprocessor will not operate properly because the value written to one of the control hardware is incorrect. However, the microprocessor 100 also includes the EDAC fuses 132 that are used to detect an incorrect value read from the correctable data fuses 152 due to a re-grown fuse 172 and to correct the incorrect value so that the correct value is written to the control hardware 124.

The microprocessor 100 also includes an instruction cache 102 that caches program instructions fetched and executed by the microprocessor 100. The program instructions may include user program instructions, such as system software or application programs or utilities.

The microprocessor 100 also includes an instruction translator 104 that receives instructions from the instruction cache 102 and, in the case of some instructions of the macroinstruction set of the microprocessor 100, translates the instructions (also referred to as macroinstructions) into one or more microinstructions that are actually executed by execution units 114 of the microprocessor 100. The microinstructions tend to be simpler than the macroinstructions. However, for some instructions of the macroinstruction set of the microprocessor 100, the instruction translator 104 transfers control to microcode sequences of microinstructions stored in a microcode ROM (not shown) of a microcode unit 116.

The microcode ROM of the microcode unit 116 also stores sequences of microinstructions of reset microcode 122. When the microprocessor 100 is reset, the microcode unit 116 begins fetching and executing microinstructions of the reset microcode 122. The reset microcode 122 performs various operations to initialize the microprocessor 100 to prepare it to begin fetching and executing user program instructions. In particular, the reset microcode 122 programs the control hardware 124 of the microprocessor 100 with the control value 134. The microprocessor 100 generates the control value 134 based on the values read from the fuses 172, which are blown at manufacturing time. However, as discussed above, the fuses 172 may re-grow after having been blown such that they change their value from a blown value to a non-blown value. The microprocessor 100 also includes the EDAC fuses 132 that enable the microprocessor 100 to correct errors in the value read from the data fuses 152. As discussed below in more detail, a signature 188 that specifies the number of the uncorrectable fuses 192 to be blown at manufacturing time is stored into the correctable data fuses 152 when the correctable fuses 152 are blown. Advantageously, the reset microcode 122 counts the number of blown uncorrectable fuses 192 and compares the counted number with the signature 188, or count, of blown uncorrectable fuses 192 that was stored in the correctable fuses 152 data at manufacturing time. This enables the reset microcode 122 to detect re-grown uncorrectable fuses 192, as described in more detail below.

The microprocessor 100 also includes an instruction dispatcher 106 that receives microinstructions, either from the instruction translator 104 or from the microcode unit 116, such as the instructions of the reset microcode 122, and dispatches the microinstructions to the execution units 114. The execution units 114 include one or more integer units that include arithmetic and logic units for performing arithmetic and logical operations. In particular, the execution units 114 are configured to perform Boolean exclusive-OR (XOR) operations on input operands, which the reset microcode 122 uses to perform the EDAC algorithm to detect and correct errors in the values read from the fuses 172. Additionally, the execution units 114 are configured to perform arithmetic operations on input operands, which the reset microcode 122 uses to perform the counting of blown uncorrectable fuses 192, and to perform comparison operations to compare the counted number of blown uncorrectable fuses 192 with the signature 188 stored in the correctable fuses 152 to detect re-growth errors in the uncorrectable fuses 192. The execution units 114 also execute instructions that read data from and write data to the control hardware 124.

The execution units 114 also execute instructions that read data from and write data to a temporary storage 144. In one embodiment, the temporary storage 144 is a random access memory (RAM). In one embodiment, the RAM is substantially as described in U.S. patent application Ser. No. 12/034,503 (CNTR.2349), filed Feb. 20, 2008, entitled MICROPROCESSOR WITH PRIVATE MICROCODE RAM, which claims priority to U.S. Provisional Application 60/910,982, filed on Apr. 10, 2007, both of which are hereby incorporated by reference in their entirety for all purposes. In particular, as described below with respect to FIG. 3, the reset microcode 122: reads the data fuses 152 and writes the value read into the temporary storage 144 as data fuse value 126; reads the EDAC fuses 132 and writes the value read into the temporary storage 144 as EDAC fuse value 128; and reads the data fuse value 126 and EDAC fuse value 128 to generate a corrected data fuse value 118 that it writes into the temporary storage 144 and subsequently reads from the temporary storage 144 for use in writing to the control hardware 124. The corrected data fuse value 118 includes the corrected signature value 183 of the signature 188 value read from the correctable fuses 152. Finally, the number 194 of blown uncorrectable fuses 192 counted by the microcode 122 is stored in temporary storage 144, as described in more detail below.

After the microprocessor 100 has read the fuses 172, corrected the data fuse value 126 if necessary, written the control hardware 124, and begun fetching and executing user program instructions, the microprocessor 100 also reads or writes portions of the control hardware 124 in response to user program instructions requesting to read or write the control hardware 124. In one embodiment, the user program instructions are the x86 architecture RDMSR and WRMSR instructions.

As described above, one difference between the correctable fuses 152 and the uncorrectable fuses 192 is that the values 164 of the uncorrectable fuses 192 are provided directly to the circuits they control without the ability for the microcode 122 to correct them using the EDAC fuses 132. Uses of the uncorrectable fuses 192 include the following, but are not limited thereto. If the manufacturer of the microprocessor 100 determines that a column of bitcells in a cache memory is bad, he can blow one of the uncorrectable fuses 192 to cause the cache memory to use a redundant column of bitcells instead of the bad column. The cache memories may include, but are not limited to, a L1 cache data array, a L2 cache tag array, and a branch target address cache array. Some of the uncorrectable fuses 192 control: the duty cycle or other controls for various phase-locked loops (PLLS) of the microprocessor 100; charge pump settings; clock the ratio of the PLLs; settings for input/output pads, including to allow debugging of multiprocessing features; whether selective clocks are moved inside the microprocessor 100 to improve frequency; redundancy of fuses in case other fuses fail; fuses used only by manufacturing for identification purposes; setting voltage identifier (VID) pins; and BSEL pins to control voltage and clock multipliers.

Figure 2:
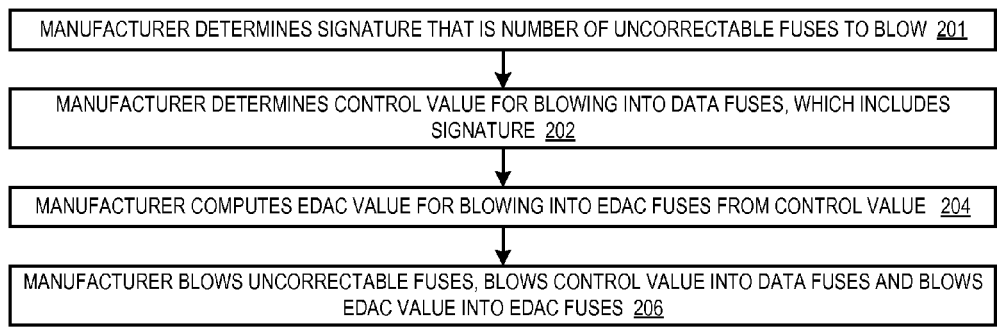
FIG. 2 is a flowchart illustrating operation of steps performed to manufacture the microprocessor of FIG. 1.

Referring now to FIG. 2, a flowchart illustrating operation of steps performed to manufacture the microprocessor 100 of FIG. 1 is shown. Flow begins at block 201.

At block 201, the microprocessor 100 manufacturer determines the signature 188, which is the number of uncorrectable fuses 192 that will be blown. Flow proceeds to block 202.

At block 202, the microprocessor 100 manufacturer determines the desired control value to be blown into the correctable data fuses 152. Each data fuse 152 constitutes a single bit that has a binary value of either zero or one, depending on whether it is blown or non-blown. The bit value read from each data fuse 152 will be either written directly to a bit of the control hardware 124 or used to generate a bit value that will be written to a bit of the control hardware 124, as described with respect to blocks 312 and 316 of FIG. 3. Thus, at block 202, the manufacturer determines which of the fuses 172 will be allocated as a correctable data fuse 152 and which of the fuses 172 will be allocated as an EDAC fuse 132, associates each correctable data fuse 152 with a bit in the control hardware 124 and determines the desired bit value to be blown into the data fuse 152. For example, the manufacturer may determine that it wants a particular data fuse 152 to store a bit that is used to selectively toggle a default microcode value that controls whether a particular branch prediction feature of the microprocessor 100 is enabled or disabled, and determines whether it wants the data fuse 152 to be blown or unblown in order to provide the desired binary value to toggle the default value. The manufacturer does this for each data fuse 152. Although each data fuse 152 constitutes a single bit, from the perspective of generating the value to be blown into the EDAC fuses 132 (at block 204 below), the data fuses 152 are viewed as a single entity having a single collective value blown into them, or as a plurality of words each having a single collective value, as discussed more with respect to block 204. In this sense, the single collective value is predetermined prior to manufacture of the microprocessor 100 and prior to its operation after being manufactured. Additionally, the control value includes the signature 188 that was determined at block 201 and that will be blown into the correctable data fuses 152 at block 206. Flow proceeds to block 204.

At block 204, the manufacturer applies the EDAC algorithm to the control value determined at block 202 to compute the EDAC value to be blown into the EDAC fuses 132. In one embodiment, the EDAC algorithm is a single error correction double error detection (SECDED) (72,64) Hamming code algorithm such as is well-known in the art of EDAC; however, other EDAC algorithms may be employed in the embodiments described herein. A vertical code algorithm will now be described.

Figure 3:
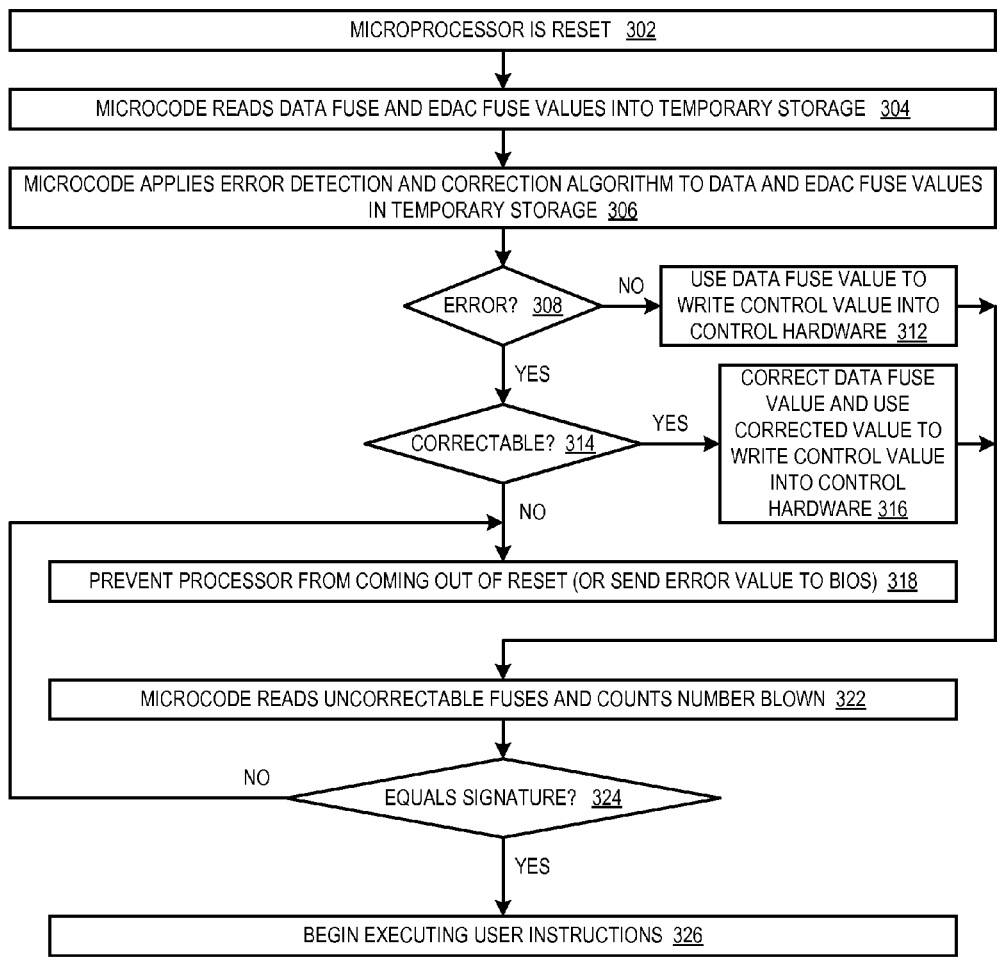
FIG. 3 is a flowchart illustrating operation of the microprocessor of FIG. 1.

In the embodiment of FIG. 3, the reset microcode 122 of FIG. 1 performs the EDAC algorithm in software to read the fuses 172 and detect and correct errors therein at block 306. Hence, in this embodiment, the manufacturer employs a vertical code algorithm to compute the EDAC value at block 204, and the reset microcode 122 employs the vertical code algorithm at block 306. In one embodiment, the fuses 172 used as correctable fuses 152 and EDAC fuses 132 are configured as 58 banks, with each bank having 64 fuses, i.e., each bank is 64 bits wide. (A similar embodiment is described in U.S. Pat. No. 7,663,957 (CNTR.2427), which is hereby incorporated by reference in its entirety for all purposes.) The first 50 banks are logically allocated as banks for correctable data fuses 152 and the last 8 banks are logically allocated as banks for EDAC fuses 132. Thus, the control value determined at block 202 is logically 50 control words of 64 bits each, and the EDAC algorithm generates 8 EDAC words that are 64 bits each. The manufacturer applies the EDAC algorithm on bit slices of the 50 control words. That is, the manufacturer applies the EDAC algorithm to the bits in bit position 0 of the 50 control words to generate the 8 EDAC word bits in bit position 0, the manufacturer applies the EDAC algorithm to the bits in bit position 1 of the 50 control words to generate the 8 EDAC word bits in bit position 1, and so forth. (Since the EDAC algorithm assumes 64 input bits to generate 8 EDAC bits, but there are only 50 control words, the manufacturer assumes all the bits in the "missing" 14 control words as zero).

Figure 4:
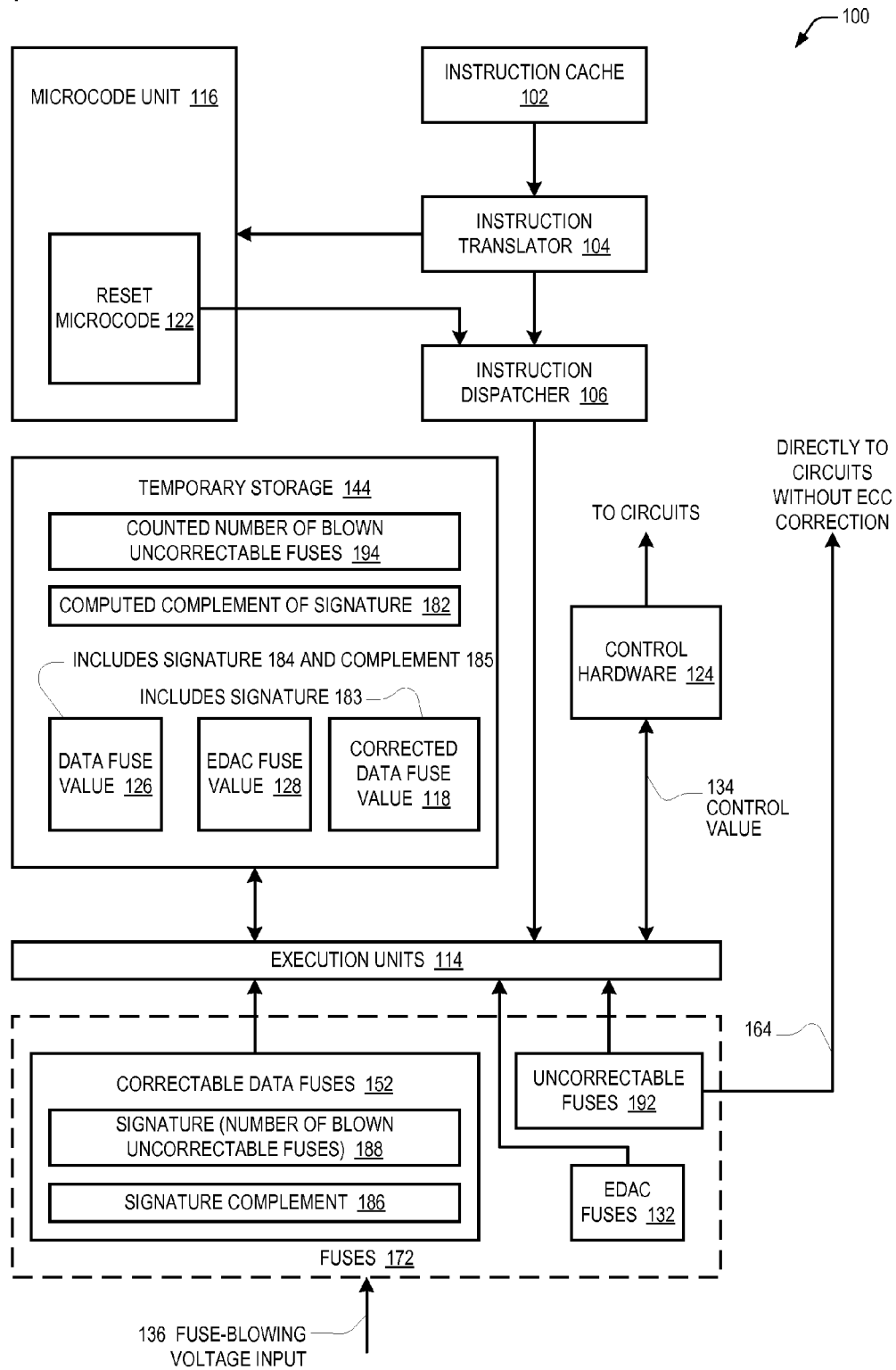
FIG. 4 is a block diagram illustrating a microprocessor.
Figure 5:
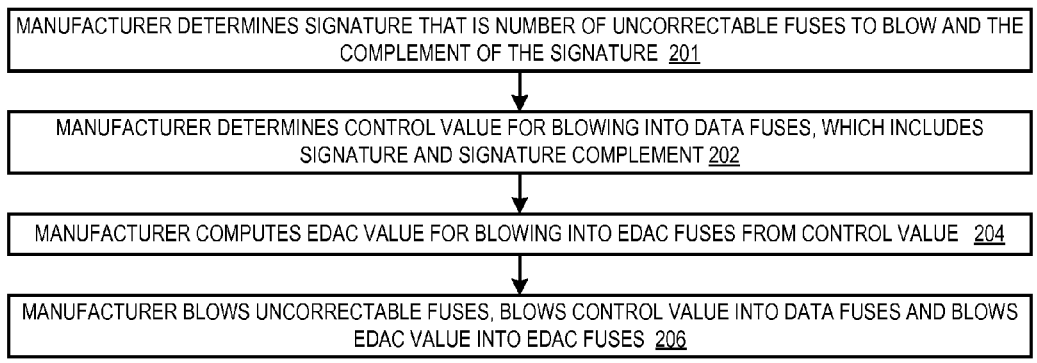
FIG. 5 is a flowchart illustrating operation of steps performed to manufacture the microprocessor of FIG. 4.

Additionally, an alternate embodiment that employs a horizontal code algorithm is contemplated, as described with respect to FIGS. 4 and 5 of U.S. patent application Ser. No. 12/609,207 (CNTR.2490). In the alternate embodiment, a hardware EDAC unit performs the EDAC algorithm in hardware to read the fuses 172 that are used as the correctable fuses 152 and EDAC fuses 132 and detect and correct errors therein. Hence, in this embodiment, the manufacturer employs a horizontal code algorithm to compute the EDAC value, and the EDAC unit employs the horizontal code algorithm. In one embodiment, the correctable fuses 152 and EDAC fuses 132 are configured as 50 banks, with each bank having 72 fuses, i.e., each bank is 72 bits wide. The fuses in the first 64 bit positions of each bank are logically allocated as data fuses 152 and the fuses in the last 8 bit positions of each bank are logically allocated as EDAC fuses 132. Thus, as in the embodiment of the previous paragraph, the control value determined at block 202 is logically 50 control words of 64 bits each; however, in this embodiment, the EDAC algorithm generates 50 EDAC words that are 8 bits each. The manufacturer applies the EDAC algorithm on a bank-by-bank basis. That is, the manufacturer applies the EDAC algorithm to the 64-bit control word associated with bank 0 to generate the 8-bit EDAC word associated with bank 0, the manufacturer applies the EDAC algorithm to the 64-bit control word associated with bank 1 to generate the 8-bit EDAC word associated with bank 1, and so forth.

It is noted that in both the vertical and horizontal embodiments, the EDAC value is computed based on the control value that includes the signature 188 that was determined at block 201 and that will be blown into the correctable data fuses 152 at block 206. Flow proceeds to block 206.

At block 206, the manufacturer blows the control value determined at block 202 into the data fuses 152 and blows the EDAC value computed at block 204 into the EDAC fuses 132. Additionally, the manufacturer blows the uncorrectable fuses 192, and in particular blows the uncorrectable fuses 192 whose number was determined at block 201. Flow ends at block 206.

Referring now to FIG. 3, a flowchart illustrating operation of the microprocessor 100 of FIG. 1 is shown. Flow begins at block 302.

At block 302, the microprocessor 100 is reset and responsively begins fetching and executing instructions of the reset microcode 122. Flow proceeds to block 304.

At block 304, the reset microcode 122 reads the data fuses 152 and EDAC fuses 132 and writes the data fuse value 126 and EDAC fuse value 128 into the temporary storage 144. The values read from the correctable data fuses 152 and EDAC fuses 132 at block 304 include the signature 188 that is the number of blown uncorrectable fuses 192. In one embodiment, the microinstruction set of the microprocessor includes an instruction to move the value of a bank of the fuses 172 into a general purpose register (not shown) of the microprocessor 100, and an instruction to move a value from a general purpose register to the temporary storage 144. Furthermore, one of the execution units 114 is adapted to execute these instructions. The reset microcode 122 uses a sequence associated with each of the fuse 172 banks that includes one instruction to read each fuse 172 bank and another instruction to write the value 126/128 into the temporary storage 144. Flow proceeds to block 306.

At block 306, the reset microcode 122 applies the EDAC algorithm to the data fuse value 126 and EDAC fuse value 128 in the temporary storage 144 to determine whether there is an error in the data fuse value 126 and, if so, whether it is correctable. In one embodiment, the microinstruction set of the microprocessor includes an instruction to move a value from the temporary storage 144 to a general purpose register, instructions to perform arithmetic and logical operations (such as exclusive-OR, shift, or rotate) on values in the general purpose registers, and an instruction to move a value from a general purpose register to the temporary storage 144. Furthermore, one of the execution units 114 is adapted to execute these instructions. The reset microcode 122 uses a sequence of these instructions to apply the EDAC algorithm to the data fuse value 126 and EDAC fuse value 128 in the temporary storage 144 to determine whether there is an error in the data fuse value 126 and, if so, whether it is correctable. In one embodiment, the reset microcode 122 employs a vertical code algorithm, as described above with respect to FIG. 2. Flow proceeds to decision block 308.

At decision block 308, the reset microcode 122 determines whether there is an error in the data fuse value 126 based on the operation performed at block 306. If so, flow proceeds to block 314; otherwise, flow proceeds to decision block 312.

At block 312, the reset microcode 122 uses the data fuse value 126 to write the control value 134 into the control hardware 124. In one embodiment, the reset microcode 122 writes the data fuse value 126 directly into the control hardware 124. In another embodiment, the reset microcode 122 modifies the data fuse value 126 to generate the control value 134 for writing into the control hardware 124. For example, in one embodiment, the reset microcode 122 exclusive-ORs the data fuse value 126 with a default control value stored as a constant in the reset microcode 122 and writes the resulting control value 134 to the control hardware 124. This enables the data fuse value 126 to serve as a toggling mechanism to toggle the microcode default control value, as described in U.S. Pat. No. 5,889,679 (CNTR.1328), which is hereby incorporated by reference in its entirety for all purposes. Furthermore, because the control hardware 124 may be multiple different types of hardware as discussed above (e.g., microcode patch hardware, feature control registers, configuration registers) and the data fuse value 126 may have multiple different corresponding portions that include multiple different types of control values, the reset microcode 122 may write some portions of the data fuse value 126 directly into portions of the control hardware 124 and may modify other portions of the data fuse value 126 before writing to the control hardware 124. Furthermore, it should be understood that the reset microcode 122 may execute a sequence of instructions to read the data fuse value 126 from the temporary storage 144 and write the portions of the data fuse value 126 (or modified portions thereof) to the control hardware 124. Flow proceeds to block 322.

At decision block 314, the reset microcode 122 determines whether the error detected at blocks 306/308 is correctable using the EDAC fuse value 128. If so, flow proceeds to block 316; otherwise, flow proceeds to block 318.

At block 316, the reset microcode 122 corrects the erroneous data fuse value 126 using the EDAC algorithm to generate the corrected data fuse value 118 and uses the corrected data fuse value 118 to write as the control value 134 into the control hardware 124. It is noted that the reset microcode 122 corrects the erroneous data fuse value 126 using the EDAC algorithm to generate the corrected data fuse value 118 regardless of whether the reset microcode 122 uses the corrected data fuse value 118 to write as the control value 134 into the control hardware 124. That is, the reset microcode 122 generates the corrected data fuse value 118 regardless of whether an error is found at decision block 308 so that the corrected signature value 183 in the temporary storage 144 may be used to compare with the counted number 194 at decision block 324 (discussed below). As discussed above with respect to block 312, the reset microcode 122 may modify the corrected data fuse value 118, or a portion thereof, before writing it to the control hardware 124. Because the values read from the correctable data fuses 152 and EDAC fuses 132 at block 304 include the signature 188 as discussed above, advantageously, at block 316 the signature 188 value may be corrected as part of the correction of the data fuse value, if necessary, and if the signature 188 is uncorrectable this condition will be detected at decision block 314 such that the uncorrectable error is acted upon appropriately at block 318. Flow proceeds to block 322.

At block 318, the reset microcode 122 prevents the microprocessor 100 from coming out of reset. If flow proceeded to block 318 from decision block 314, this is because the number of bits in error in the data fuse value 126 is too great for the microprocessor 100 to correct using the EDAC fuse value 128. That is, the reset microcode 122 prevents the microprocessor 100 from fetching and executing user program instructions. In an alternate embodiment, the reset microcode 122 allows the microprocessor 100 to come out of reset, i.e., to fetch and execute user program instructions such as BIOS or other system software; however, the reset microcode 122 sends an error status to the system software to indicate that there was an uncorrectable error in the data fuse value 126. If flow proceeded to block 318 from block 324 (discussed below), the reset microcode 122 prevents the microprocessor 100 from coming out of reset because the reset microcode 122 determined that the signature 188 read from the corrected data fuse value 118 in the temporary storage 144 and compared with the number 194 counted at block 322 (discussed below) is not equal. Flow ends at block 318.

At block 322, the microcode 122 reads the uncorrectable fuses 192 and counts the number of them that are blown and writes the number 194 to the temporary storage 144. Flow proceeds to decision block 324.

At decision block 324, the microcode 122 reads the signature 183 from the corrected data fuse value 118 in the temporary storage 144 and compares the number 194 counted at block 322 with the signature 183 to determine if they are equal. If not, flow proceeds to block 318; otherwise, flow proceeds to block 326. In another embodiment, the microcode 122 reads the signature from the data fuse value 126 in the temporary storage 144 and compares the number 194 counted at block 322 with the signature to determine if they are equal. That is, the microcode 122 uses a signature that has potentially not been corrected using the EDAC algorithm at block 306.

At block 326, the microcode 122 causes the microprocessor 100 to begin executing user program instructions. Flow ends at block 326.

Regarding the solution to the problem of re-growing uncorrectable fuses 192 described with respect to FIGS. 1-3, it is noted that the signature 188 itself is blown into fuses 172, which themselves may re-grow. The problem with the signature 188 re-growing is somewhat ameliorated according to one embodiment by the fact that the signature 188 may be blown into the correctable fuses 152 that are subject to error detection by the EDAC scheme described above. However, EDAC schemes have a limitation on the number of bits in error they can detect. Thus, the possibility exists that too many of the correctable fuses 152 may re-grow such that an error in the signature 188 may not be detected. A solution to this problem is described with respect to FIGS. 4 through 6 below.

More specifically, the problem is solved by blowing not only the signature 188 but also the complement 186 of the signature (see FIG. 4) into the correctable fuses 152. Then the signature 188 and its complement 186 are read from the correctable fuses 152, a complementing operation of the signature 188 is performed to generate a result, and the result is compared with the complement 186 of the signature read from the correctable fuses 152. If the compare generates a mismatch, then an error has been detected. This solution potentially has higher reliability than the EDAC error detection scheme of FIGS. 1 through 3 because in order not to detect an error in the signature 188, the corresponding bits in the signature 188 and its complement 186 in the fuses 172 would have to invert their state. This would require a fuse 172 in the signature 188 to go from a blown state to a non-blown state (e.g., re-grow), and the corresponding bit fuse 172 in the complement 186 to go from a non-blown state to a blown state, or vice versa. However, although we have readily observed a fuse 172 go from a blown state to a non-blown state (the larger problem we are trying to solve), we do not readily observe fuses 172 going from a non-blown state to a blown state. Consequently, it is highly improbable for the signature/signature-complement scheme to not detect an error in the signature 188 of blown uncorrectable fuses 192.

Referring now to FIG. 4, a block diagram illustrating a microprocessor 100 according to an alternate embodiment is shown. The microprocessor 100 of FIG. 4 is similar to the microprocessor 100 of FIG. 1; therefore, only new and/or different elements will be described here. One difference is that the correctable fuses 152 include not only the signature 188 that is the number of blown uncorrectable fuses 192, but also include a signature complement 186, i.e., the Boolean inverted value of the signature 188. Furthermore, not only does the data fuse value 126 read from the correctable data fuses 152 into the temporary storage 144 include the signature 184, additionally it includes the signature complement 185. Still further, the reset microcode 122 computes the complement of the signature 184 as computed complement of signature 182.

Referring now to FIG. 5, a flowchart illustrating operation of steps performed to manufacture the microprocessor 100 of FIG. 4 is shown. Flow begins at block 201.

At block 201, the microprocessor 100 manufacturer determines the signature, which is the number of uncorrectable fuses 192 that will be blown. Additionally, the microprocessor 100 manufacturer determines the complement of the signature. Flow proceeds to block 202.

At block 202, the microprocessor 100 manufacturer determines the desired control value to be blown into the correctable data fuses 152. The step at block 202 of FIG. 5 is similar to the step at block 202 of FIG. 2. However, it is noted that the control value includes not only the signature that was determined at block 201 and that will be blown into the correctable data fuses 152 at block 206, but the control value also includes the complement of the signature determined at block 201. Flow proceeds to block 204.

At block 204, the manufacturer applies the EDAC algorithm to the control value determined at block 202 to compute the EDAC value to be blown into the EDAC fuses 132. The step at block 204 of FIG. 5 is similar to the step at block 204 of FIG. 2. However, it is noted that the EDAC value is computed based on the control value that was determined at block 201 of FIG. 5, which includes both the signature and the complement of the signature. Flow proceeds to block 206.

At block 206, the manufacturer blows the control value determined at block 202 into the data fuses 152 and blows the EDAC value computed at block 204 into the EDAC fuses 132 similar to the step at block 206 of FIG. 2. Flow ends at block 206.

Figure 6:
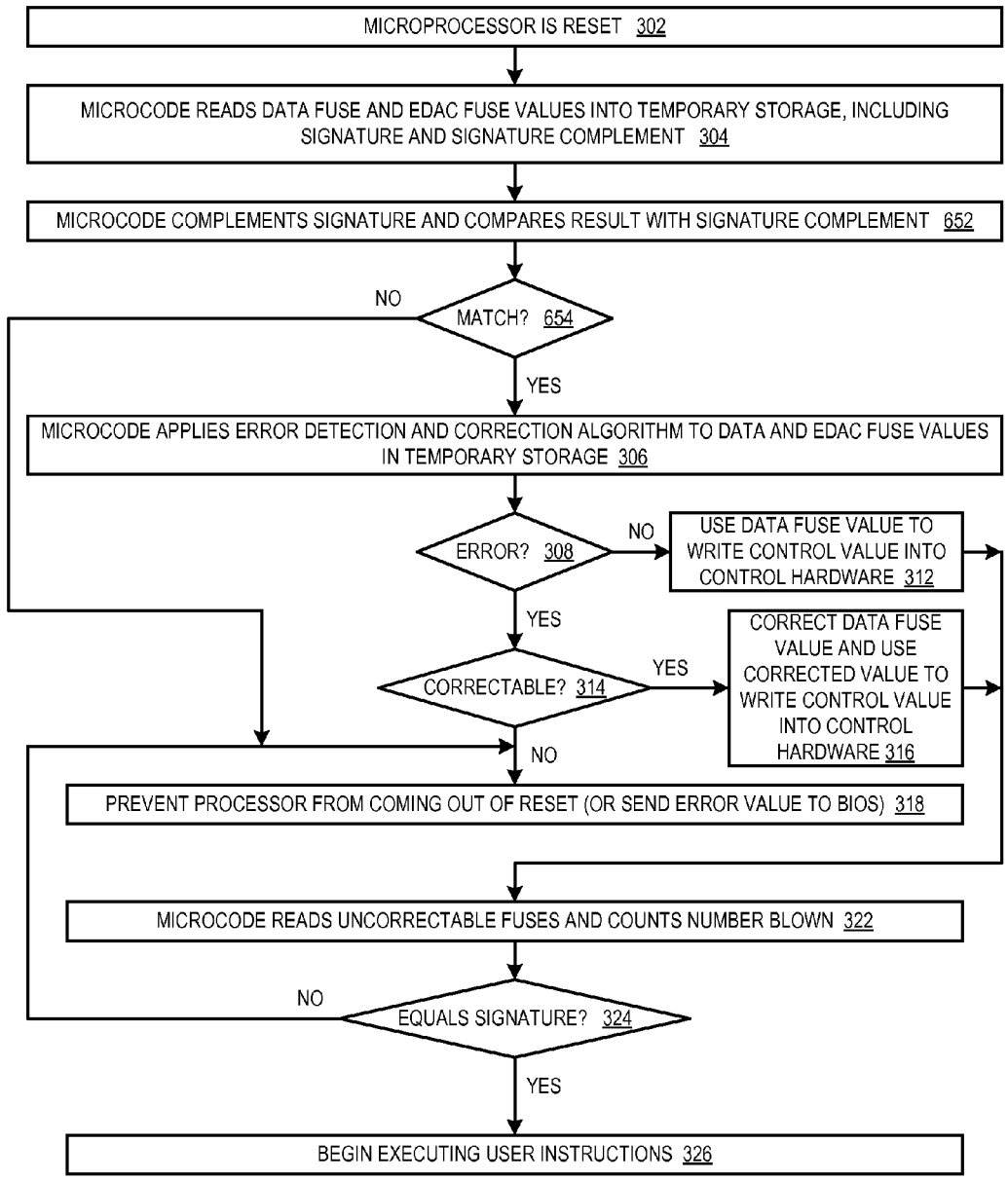
FIG. 6 is a flowchart illustrating operation of the microprocessor of FIG. 4.

Referring now to FIG. 6, a flowchart illustrating operation of the microprocessor 100 of FIG. 4 is shown. The steps performed in FIG. 6 are similar to the steps performed in FIG. 3 with the following differences noted.

At block 304, the data fuse value 126 read by the reset microcode 122 from the data fuses 152 and written into the temporary storage 144 includes the signature 184 and signature complement 185. Flow proceeds from block 304 to new block 652.

At block 652, the microcode 122 complements the signature 184 from the temporary storage 144 to generate a result. The microcode 122 then compares the result with the signature complement 182 from the temporary storage 144. Flow proceeds to new decision block 654.

At decision block 654, the microcode 122 determines whether the comparison performed at block 652 yields a match. If the complemented result generated at block 652 matches the signature complement 182, flow proceeds to block 306; otherwise, flow proceeds to block 318 since the microprocessor 100 has determined that an error in the signature 188 and/or signature complement 186 developed.

An advantage of the embodiment of FIGS. 4 through 6 is that it does not require the signature 188 in the fuses 172 to be correctable by ECC, yet the complement 186 provides an integrity check of the signature 188.

Regarding the solution to the problem of re-growing uncorrectable fuses 192 described with respect to embodiments of FIGS. 1 through 6, the tests are run in response to a reset of the processor. If a fuse re-growth error is detected at reset time, one option is to kill the part, i.e., the reset microcode prevents the microprocessor part from coming out of reset. However, if the part kills itself, then the computer is completely dead to the BIOS and therefore dead to the user, i.e., the computer cannot run any code so it cannot even beep, or turn lights on or off, or generate any video messages to the user to indicate the error. This makes it very difficult to gather meaningful field failure information for failure analysis and resolution.

The other option is to let the part keep running and attempt to report the error somehow. However, the error reporting mechanisms available to the processor itself (i.e., absent any external code running on it) are limited, particularly since the processor reset code is not free to just write to memory, and even if it was the BIOS reset tests would likely clobber it. If the reset-time processor fuse test error status is going to be preserved, the BIOS must immediately read the error status as soon as it begins to run. This requires the system manufacturer to be willing to let the microprocessor 100 manufacturer add code to the BIOS that is custom to its processor, particularly to read the error status reported by the processor. However, the manufacturer may not have this opportunity in all systems in which its processor is used.

A solution is to make the fuse tests user-initiated, rather than only reset-initiated. Therefore, a new model specific register (MSR) is added to the microprocessor 100 such that when user software executes a WRMSR instruction to the new MSR, the microprocessor 100 performs one or both of the fuse tests described above and then reports any errors detected. This enables the software to present error messages to the user about errors detected. Additionally, it lets the user choose whether he wants to proceed using the system or shut it down.

Additionally, whether to perform the fuse tests at reset time is an option that may be selected at manufacturing time by selectively blowing a fuse to indicate which option (e.g., blown fuse indicates do not run fuse tests at reset time, unblown fuse indicates run fuse tests at reset time). However, fuses are unreliable, so rather than blowing a single fuse to select the option, multiple fuses (187 of FIG. 7) are blown (e.g., four) and logically ORed together to determine which option was selected. Even if the reset-time fuse test option is chosen, the user-initiated fuse tests are still available via the WRMSR.

Figure 7:
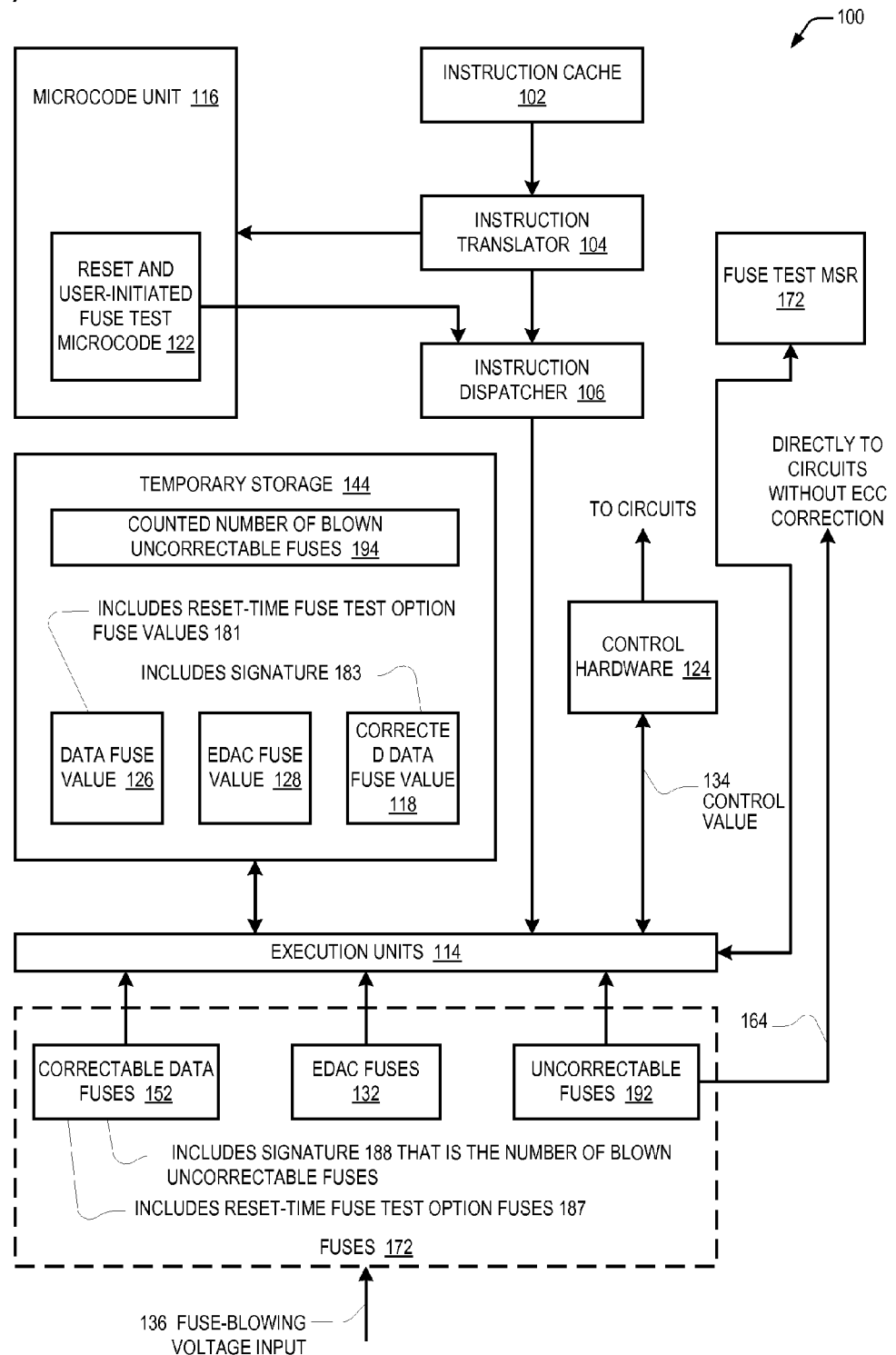
FIG. 7 is a block diagram illustrating a microprocessor.

Referring now to FIG. 7, a block diagram illustrating a microprocessor 100 according to an alternate embodiment is shown. The microprocessor 100 of FIG. 7 is similar to the microprocessor 100 of FIG. 1; therefore, only new and/or different elements will be described here. One difference is that blown into fuses 187 of the correctable data fuses 152 is the option for whether or not to run the fuse tests at reset time. Another difference is that the microcode 122 not only includes the reset-time fuse test microcode routines, but also includes the user-initiated fuse test microcode routines. In one embodiment, a significant part of the reset-time fuse test microcode routines and the user-initiated fuse test microcode routines are the same code. Furthermore, the data fuse value 126 read from the correctable data fuses 152 into the temporary storage 144 includes the reset-time fuse test option fuse values 181. Additionally, the microprocessor 100 includes a new MSR 172 that may be written by a user program, such as a BIOS or other system software, to cause the microprocessor 100 to perform the fuse tests and return an error status value in the MSR 172 for the user program to read via a RDMSR instruction. Finally, other relevant functional units of the microprocessor 100, such as the instruction translator 104, instruction decoder 108, execution units 114, and microcode 122 are modified to decode and execute the WRMSR and RDMSR instructions directed to the new MSR 172, as described below with respect to FIGS. 10 and 11.

Figure 8:
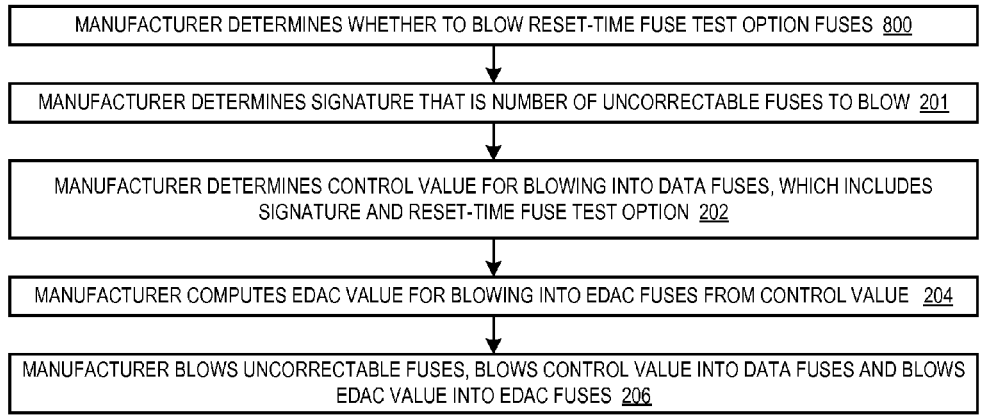
FIG. 8 is a flowchart illustrating operation of steps performed to manufacture the microprocessor of FIG. 7.

Referring now to FIG. 8, a flowchart illustrating operation of steps performed to manufacture the microprocessor 100 of FIG. 7 is shown. Flow begins at new block 800.

At block 800, the microprocessor 100 manufacturer determines whether to blow the reset-time fuse test option fuses 187 of FIG. 7. Flow proceeds to block 201.

At block 201, the microprocessor 100 manufacturer determines the signature, which is the number of uncorrectable fuses 192 that will be blown. Flow proceeds to block 202.

At block 202, the microprocessor 100 manufacturer determines the desired control value to be blown into the correctable data fuses 152. The step at block 202 of FIG. 8 is similar to the step at block 202 of FIG. 2. However, it is noted that the control value also includes the reset-time fuse test option fuse 187 values determined at block 800 and that will be blown into the correctable data fuses 152 at block 206. Flow proceeds to block 204.

At block 204, the manufacturer applies the EDAC algorithm to the control value determined at block 202 to compute the EDAC value to be blown into the EDAC fuses 132. The step at block 204 of FIG. 8 is similar to the step at block 204 of FIG. 2. However, it is noted that the EDAC value is computed based on the control value that includes the reset-time fuse test option fuse 187 values determined at block 800 and that will be blown into the correctable data fuses 152 at block 206. Flow proceeds to block 206.

At block 206, the manufacturer blows the control value determined at block 202 into the data fuses 152 and blows the EDAC value computed at block 204 into the EDAC fuses 132 similar to the step at block 206 of FIG. 2. Additionally, the manufacturer blows the uncorrectable fuses 192, and in particular blows the uncorrectable fuses 192 whose number was determined at block 201. Flow ends at block 206.

Figure 9:
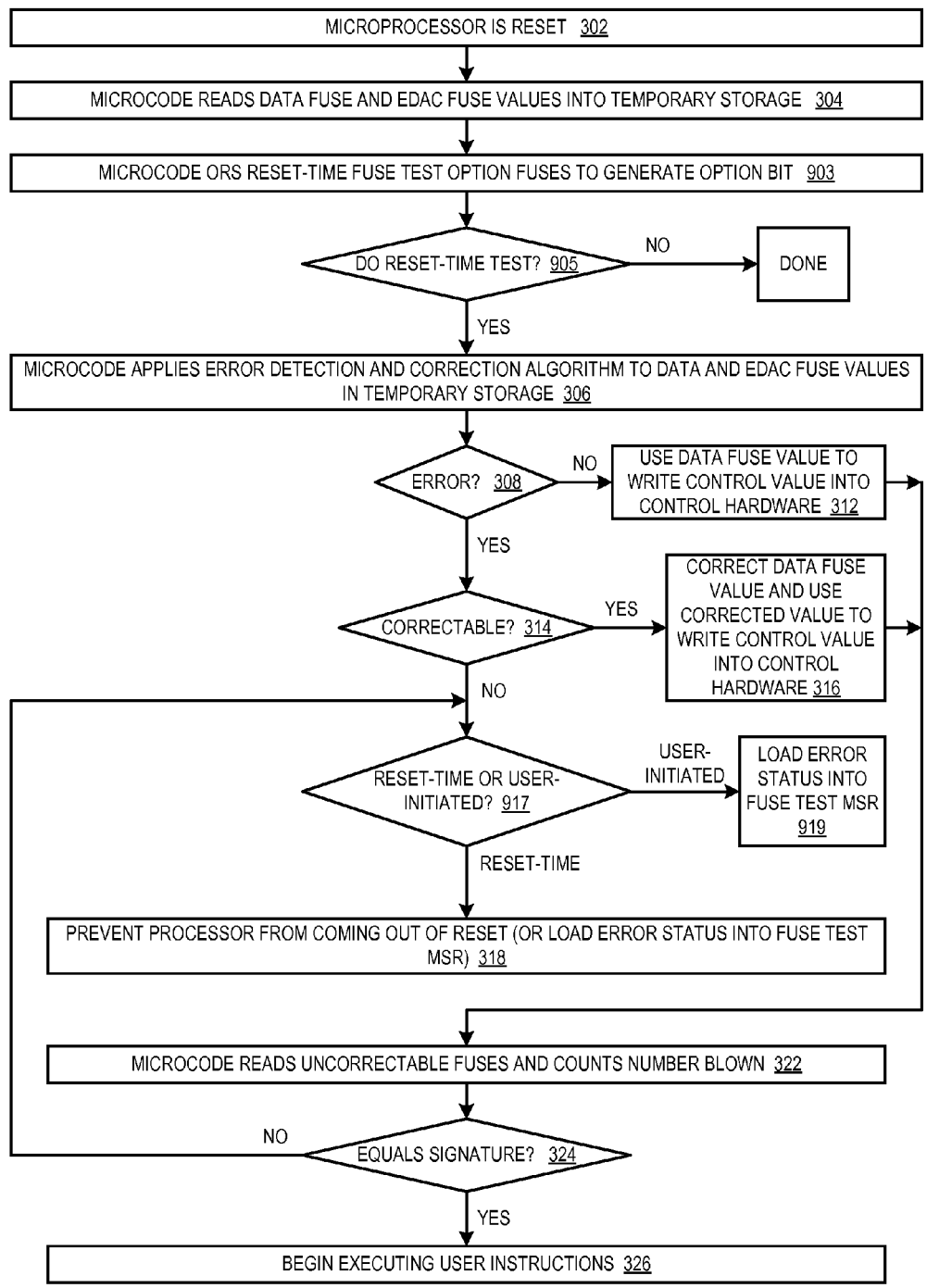
FIG. 9 is a flowchart illustrating operation of the microprocessor of FIG. 7.

Referring now to FIG. 9, a flowchart illustrating operation of the microprocessor 100 of FIG. 7 is shown. The steps performed in FIG. 9 are similar to the steps performed in FIG. 3 with the following differences noted. The values read from the correctable data fuses 152 at block 304 also include the reset-time fuse test option fuse values as discussed above.

Additionally, flow proceeds from block 304 to new block 903. At block 903, the reset microcode 122 ORs together the reset-time fuse test option fuse values 181 read from the temporary storage 144 to generate an option bit value. Flow proceeds to new decision block 905.

At decision block 905, the reset microcode 122 determines whether the value generated at block 903 indicates to do the reset-time fuse tests. If so, flow proceeds to block 306; otherwise, flow ends.

Finally, flow proceeds from the "No" branch of decision block 314 to new decision block 917.

At decision block 917, the reset microcode determines whether the uncorrectable failure was detected by a reset-time fuse test or by a user-initiated fuse test. If reset-time, flow proceeds to block 318; otherwise, flow proceeds to new block 919.

At block 919, the user-initiated fuse test microcode 122 loads the error status value into the fuse test MSR 172 of FIG. 7. Flow ends at block 919.

Figure 10:
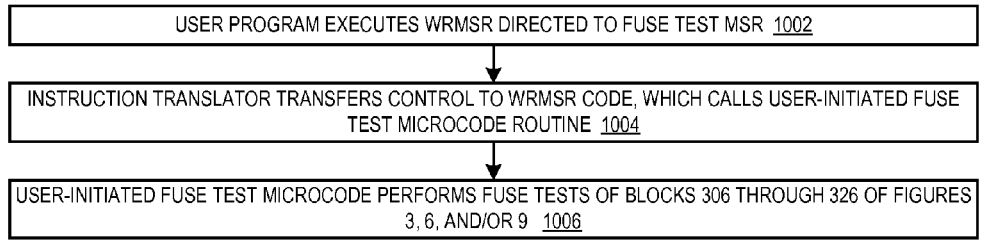
FIG. 10 is a flowchart illustrating operation of the microprocessor of FIG. 7.

Referring now to FIG. 10, a flowchart illustrating operation of the microprocessor 100 of FIG. 7 to execute a WRMSR instruction directed to the fuse test MSR 172 of FIG. 7 is shown. Flow begins at block 1002.

At block 1002, the user program executes a WRMSR instruction directed to the fuse test MSR 172. Flow proceeds to block 1004.

At block 1004, the instruction translator 104 decodes the WRMSR instruction and transfers control to the WRMSR handler in the microcode 122, which calls the user-initiated fuse test microcode routine 122. Flow proceeds to block 1006.

At block 1006, the user-initiated fuse test microcode routine 122 performs the fuse tests as described in blocks 306 through 326 of FIGS. 3, 6, and/or 9. In particular, the microcode 122 populates the fuse test MSR 172 with the error status at block 919 of FIG. 9. Flow ends at block 1006.

Figure 11:
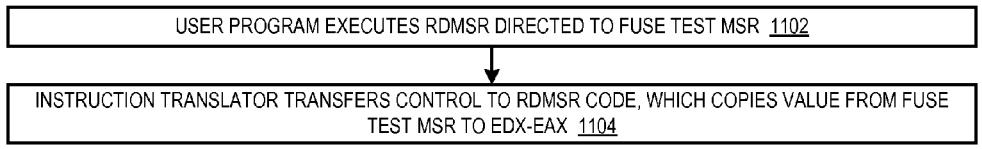
FIG. 11 is a flowchart illustrating operation of the microprocessor of FIG. 7.

Referring now to FIG. 11, a flowchart illustrating operation of the microprocessor 100 of FIG. 7 to execute a RDMSR instruction directed to the fuse test MSR 172 of FIG. 7 is shown. Flow begins at block 1102.

At block 1102, the user program executes a RDMSR instruction directed to the fuse test MSR 172. Flow proceeds to block 1104.

At block 1104, the instruction translator 104 decodes the RDMSR instruction and transfers control to the RDMSR handler in the microcode 122, which copies the value from the fuse test MSR 172 to EDX-EAX registers, which may be read by the user program. Flow ends at block 1104.

Although embodiments have been described with respect to the x86 architecture, other embodiments are contemplated that provide a user-initiated fuse test for processors of other architectures. The extensive use of fuses in a microprocessor to accomplish many crucial functions generates a need for a reliable way to know when they have re-grown. The embodiments described above with respect to FIGS. 7 through 11 help accomplish that goal by enabling the manufacturer to gather more useful failure data from the field. Additionally, it may provide the user with a more meaningful failure indication than a dead system.

As described in the embodiments above, when the microprocessor powers up, some of the control values, namely those in the uncorrectable fuses, are scanned directly to hardware registers without giving the reset microcode the ability to correct them using the EDAC technique. In one embodiment of the microprocessor, microcode could not even read these uncorrectable fuses. Other embodiments are described above that enable the uncorrectable fuses to be read to detect if there is an error in the control value read from them. However, the embodiments described above do not enable the detected error to be corrected.

Embodiments are described below with respect to FIGS. 12 through 14 that give microcode the ability to correct the "uncorrectable" fuses. Specifically, the "uncorrectable" fuses now include EDAC fuses along with data fuses. At reset, the "uncorrectable" fuse values are read into scan registers associated with each fuse bank. A state machine then serially scans the "uncorrectable" data and EDAC fuse values from the scan registers into a microcode-readable register. The microcode corrects the data fuse values if necessary and writes the corrected values to a microcode-writeable register, which causes the corrected values in the microcode-writeable register to be serially scanned back to the scan registers in the fuse banks The microcode then causes the corrected values in the scan registers to be serially scanned back out to the control hardware, such as the cache correction control registers and PLL adjustment control registers.

Figure 12:
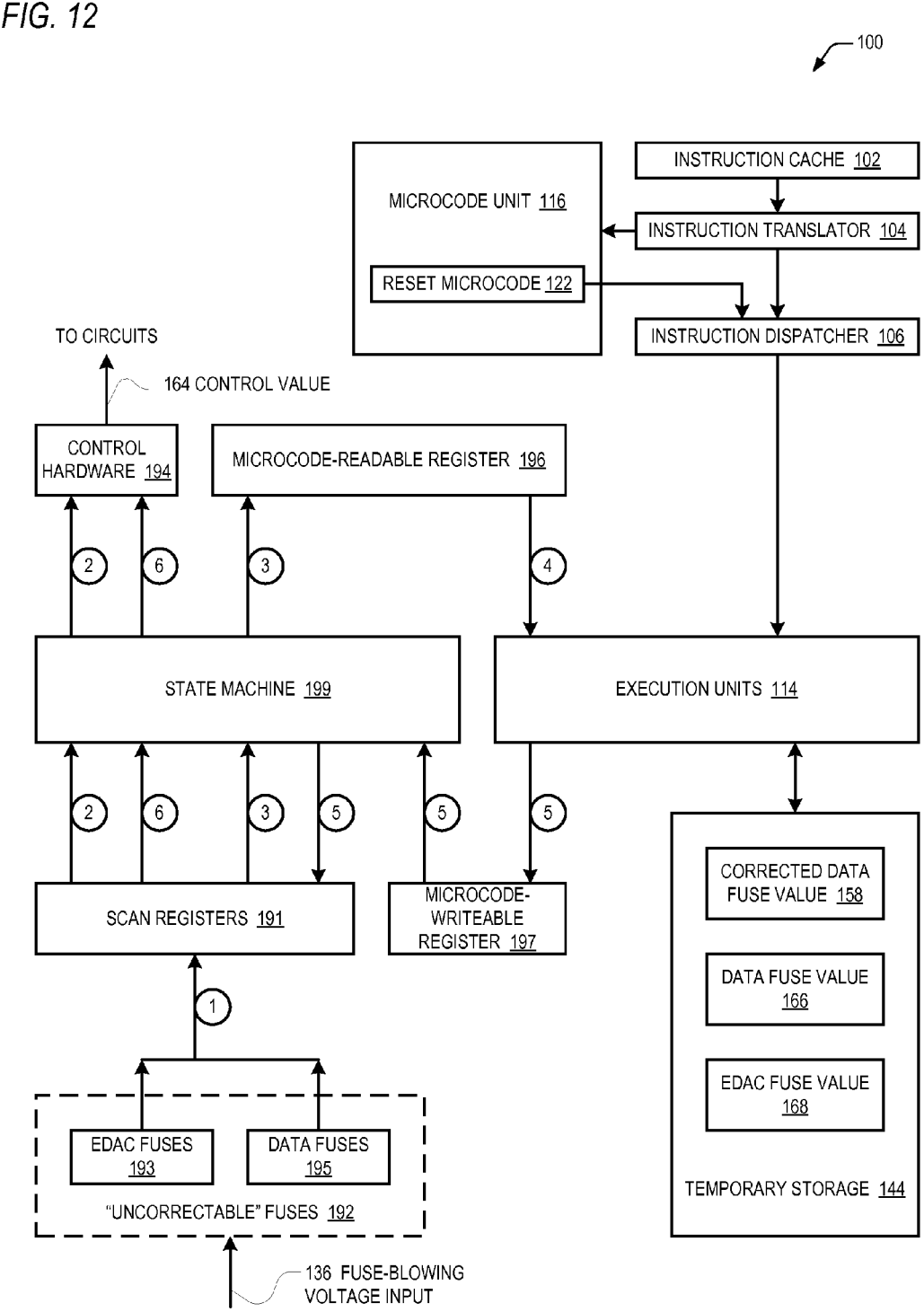
FIG. 12 is a block diagram illustrating a microprocessor.

Referring now to FIG. 12, a block diagram illustrating a microprocessor 100 according to an alternate embodiment is shown. The microprocessor 100 of FIG. 12 includes an instruction cache 102, instruction translator 104, instruction dispatcher 106, execution units 114, microcode unit 116, reset microcode 122, a fuse-blowing voltage input 136, and temporary storage 144, similar to those described with respect to the microprocessor 100 of FIG. 1.

The microprocessor 100 also includes control hardware 194. The control hardware 194 is configured to receive and store a control value 164 and to provide the control value 164 to various circuits of the microprocessor 100 for controlling operation of the microprocessor 100. The control hardware 194 may control, but is not limited to, the following: selection of redundant column of bitcells to replace a bad column of bitcells in a cache memory; the duty cycle or other controls for various phase-locked loops (PLLS) of the microprocessor 100; charge pump settings; PLL clock ratios; settings for input/output pads, including to allow debugging of multiprocessing features; whether selective clocks are moved inside the microprocessor 100 to improve frequency; redundancy of fuses in case other fuses fail; fuses used only by manufacturing for identification purposes; setting voltage identifier (VID) pins; and BSEL pins to control voltage and clock multipliers.

The microprocessor 100 also includes uncorrectable fuses 192. The uncorrectable fuses 192 of FIG. 12 include both data fuses 195 and EDAC fuses 193. The EDAC fuses 193 provide the ability for the microcode 122 to correct the errors in the data fuses 195, such as due to fuse re-growth, as described below.

The microprocessor 100 also includes scan registers 191 coupled to the data fuses 195 and EDAC fuses 193 by a parallel interface. The microprocessor 100 also includes a microcode-readable register 196 and a microcode-writeable register 197, each coupled to the execution units 114. In one embodiment, the microcode-readable register 196 and the microcode-writeable register 197 are each 64 bits wide. The microprocessor 100 also includes a state machine 199. The state machine 199 is coupled by individual bi-directional serial interfaces to: the scan registers 191, the microcode-readable register 196, the microcode-writeable register 197, and the control hardware 194. In one embodiment, the state machine 199 is a common on-chip processor (COP) configured to, among other things, scan serial bit streams between storage elements using the well-know JTAG mechanism. In one embodiment, the serial interfaces operate at a fraction of the core clock frequency of the microprocessor 100; in one embodiment the fraction is one-eighth. This provides the advantage that the distances between the fuses 192, state machine 199, and control hardware 194 may be relatively far; additionally, the microcode-readable register 196 and microcode-writeable register 197—which interface the parallel domain of the microprocessor 100 (e.g., the execution units 114) and the serial domain of the microprocessor 100 (e.g., the fuses 192, state machine 199, and control hardware 194)—may be relatively close to the parallel domain which operates at the full core clock frequency yet relatively far from the serial domain that operates at the fraction of the core clock frequency.

Additionally, as described in more detail below, the reset microcode 122: reads the data fuses 195 and writes the value read into the temporary storage 144 as data fuse value 166; reads the EDAC fuses 193 and writes the value read into the temporary storage 144 as EDAC fuse value 168; and reads the data fuse value 166 and EDAC fuse value 168 to generate a corrected data fuse value 158 that it writes into the temporary storage 144 and subsequently reads from the temporary storage 144 for use in writing to the microcode-writeable register 197.

Referring now to FIG. 13, a flowchart illustrating operation of steps performed to manufacture the microprocessor 100 of FIG. 12 is shown. The steps shown in FIG. 12 are similar to those described with respect to FIG. 2 of U.S. patent application Ser. No. 12/609,207 (CNTR.2490); however, the steps are performed with respect to the uncorrectable fuses 192 of FIG. 12 (namely the data fuses 195 and EDAC fuses 193), rather than with respect to the fuses 172 of FIG. 1, as will now be described. Flow begins at block 202.

At block 202, the microprocessor 100 manufacturer determines the desired control value to be blown into the data fuses 195. Each data fuse 195 constitutes a single bit that has a binary value of either zero or one, depending on whether it is blown or non-blown. The bit value read from each data fuse 195 will be scanned to a bit of the control hardware 194, as described with respect to FIG. 14. Thus, at block 202, the manufacturer determines which of the fuses 192 will be allocated as a data fuse 195 and which of the fuses 192 will be allocated as an EDAC fuse 193, associates each data fuse 195 with a bit in the control hardware 194 and determines the desired bit value to be blown into the data fuse 195. The manufacturer does this for each data fuse 195. Although each data fuse 195 constitutes a single bit, from the perspective of generating the value to be blown into the EDAC fuses 193 (at block 204 below), the data fuses 195 are viewed as a single entity having a single collective value blown into them, or as a plurality of words each having a single collective value, as discussed more with respect to block 204. In this sense, the single collective value is predetermined prior to manufacture of the microprocessor 100 and prior to its operation after being manufactured. Flow proceeds from block 202 to block 204.

At block 204, the manufacturer applies the EDAC algorithm to the control value determined at block 202 to compute the EDAC value to be blown into the EDAC fuses 193. The EDAC algorithm may be one of the algorithms discussed above, including the vertical and horizontal code algorithms discussed with respect to FIGS. 2 and 3. Flow proceeds to block 206.

At block 206, the manufacturer blows the control value determined at block 202 into the data fuses 195 and blows the EDAC value computed at block 204 into the EDAC fuses 193. Flow ends at block 206.

Referring now to FIG. 14, a flowchart illustrating operation of the microprocessor 100 of FIG. 12 is shown. Some of the steps performed in the blocks of FIG. 14 are illustrated in FIG. 12 with encircled numbers 1 through 6, referred to below as steps (1) through (6). Flow begins at block 1402.

At block 1402, the microprocessor 100 is reset and responsively begins fetching and executing instructions of the reset microcode 122. Flow proceeds to block 1404.

At block 1404, as shown in step (1) of FIG. 12, the uncorrectable fuse 192 values (i.e., the data fuse 195 values and the EDAC fuse 193 values) are loaded into the scan registers 191. Flow proceeds to block 1406.

At block 1406, as shown in step (2) of FIG. 12, the state machine 199 serially scans the data fuse 195 values that were loaded into the scan registers 191 at block 1404 into the control hardware 194 so that the microprocessor 100 may operate with the initial values from the data fuses 195, even though it is possible that one or more of the data fuses 195 have re-grown. This is necessary because the microprocessor 100 cannot operate properly without the control hardware 194 being loaded with at least some values. In one embodiment, there are on the order of 1000 uncorrectable fuses 192 and sufficient scan registers 191 (each 32 bits in one embodiment) to read them into; the scan registers 191 are serially connected in a sequential fashion such that their values may be serially scanned into and out of the scan registers 191, thereby saving significant wiring hardware that would be required to employ a parallel bus connecting each of the scan registers 191 to the state machine 199 or other elements of the microprocessor 100. Flow proceeds to block 1408.

At block 1408, as shown in step (3) of FIG. 12, the microcode 122 executes instructions that cause the state machine 199 to read the data fuse 195 and EDAC fuse 193 values from the scan registers 191 to the microcode-readable register 196. Flow proceeds to block 1412.

At block 1412, as shown in step (4) of FIG. 12, the reset microcode 122 reads the microcode-readable register 196 and writes the data fuse value 166 and EDAC fuse value 168 into the temporary storage 144. Then, the reset microcode 122, similar to the operation described in block 306 of FIG. 3, applies the EDAC algorithm to the data fuse value 166 and EDAC fuse value 168 to determine whether there is an error in the data fuse value 166 and, if so, whether it is correctable. Flow proceeds to decision block 1414.

At decision block 1414, the microcode 122 determines whether there is an uncorrectable error in the data fuse value 166 based on the operation performed at block 1412. If so, flow proceeds to block 1416; otherwise, flow proceeds to decision block 1418.

At block 1416, the reset microcode 122 prevents the microprocessor 100 from coming out of reset because the number of bits in error in the data fuse value 166 is too great for the microprocessor 100 to correct using the EDAC fuse value 168. That is, the reset microcode 122 prevents the microprocessor 100 from fetching and executing user program instructions. In an alternate embodiment, the reset microcode 122 allows the microprocessor 100 to come out of reset, i.e., to fetch and execute user program instructions such as BIOS or other system software; however, the reset microcode 122 sends an error status to the system software to indicate that there was an uncorrectable error in the data fuse value 166, similar to the operation described above with respect to block 318 of FIG. 3. Flow ends at block 1416.

At block 1418, the reset microcode 122 corrects the erroneous data fuse value 166, if necessary, using the EDAC algorithm to generate the corrected data fuse value 158 and, as shown in step (5) of FIG. 12, writes the corrected data fuse value 158 to the microcode-writeable register 197, which causes the state machine 199 to serially scan the corrected values 158 that were written into the microcode-writeable register 197 back to the scan registers 191. In one embodiment, the microinstruction set of the microprocessor 100 includes an instruction to cause the state machine 199 to perform the operation. Flow proceeds to block 1422.

At block 1422, as shown in step (6) of FIG. 12, the microcode 122 causes the state machine 199 to serially scan the corrected values from the scan registers 191 out to the control hardware 194 to control operation of the microprocessor 100 using the corrected values 158 rather than the initial values that were scanned out during block 1406. Advantageously, if there were any correctable errors in the initial values, the errors are now corrected. Flow proceeds to block 1424.

At block 1424, the microcode 122 completes its initialization of the microprocessor 100 and then causes the microprocessor 100 to begin fetching and executing user instructions. Flow ends at block 1424.

In one embodiment, a portion of the data fuse 195 values received by the state machine 199 from the scan registers 191 comprises address information that specifies a destination location among the control hardware registers 194 for the associated data. That is, the state machine 199 processes the address information portion of the data fuse 195 values and writes the data portion of the data fuse 195 values to the appropriate control hardware register 194 specified by the address bits. In this embodiment, the fact that, as described with respect to FIGS. 12 through 14, the microcode 122 corrects the data fuse value 166 to create the corrected data fuse value 158 and causes the state machine 199 to serially scan the corrected data fuse value 158 again to the control hardware 194 implies that the microcode 122 corrects not only the data portion of the data fuse value 166, but also advantageously corrects the address portion of the data fuse value 166. Other benefits are that the EDAC calculations performed by the microcode 122 are less complex and there are potentially fewer bits to correct when an error is detected than an embodiment in which the microcode was to read the values from the destination control hardware registers and use EDAC fuse values to perform the error detection and correction on the values read from the destination control hardware registers. To illustrate by way of an example, assume the uncorrectable fuses 192 are used to replace a bad column of bitcells in a cache memory with a redundant column of bitcells. Assume there are 1024 columns in the cache memory, and each of the 1024 columns has an associated six-bit register in the control hardware 194 to specify one of 64 redundant columns to use as a replacement for a bad column. That is, there are 1024 potential destination locations in the control hardware 194 to which a six-bit data quantum from the corrected data fuse value 158 may need to be written in order to replace a bad column with one of 64 redundant columns. Thus, assume a configuration in which there are 64 sixteen-bit address/data fuse sets in the data fuses 195. More specifically, the first ten bits are an address indicating which of 1024 six-bit data registers in the destination control hardware 194 is to be altered from its default value of zero, and the last six bits are the new data value. In this example, the embodiment of FIGS. 12 through 14 requires enough EDAC fuses 193 to detect and correct only 64*16=1024 bits in the data fuse value 166. Whereas, in an embodiment in which the microcode was to read the values from the destination control hardware registers and use EDAC fuses to perform the error detection and correction, the microcode would need to read all 1024 control registers, i.e., 1024*6=6,144 bits, to detect and correct an error since it would not know which of the registers in the control hardware had an erroneous value, thus requiring more EDAC fuses than the embodiment of FIGS. 12 through 14.

As may be observed from the foregoing, the apparatus and method described herein provide an advantage over the apparatus and method described with respect to FIGS. 1 through 11 above because the embodiments of FIGS. 12 through 14 enable both detection and correction of errors in the uncorrectable fuses 192, whereas the apparatus and method described in FIGS. 1 through 11 only enable detection of errors.

The reset-time tests described in FIGS. 12 through 14 may also be performed as user-initiated tests similar to the manner described with respect to the embodiments of FIGS. 7 through 11.

An advantage of the apparatus and method described in FIGS. 12 through 14 is that using serial buses to communicate with the scan registers 191 and control hardware 194 may substantially reduce the number of wires required to convey the corrected fuse values 164 to the control hardware 194. This is because the fuses 192 may be located spatially far from the control hardware 194 and/or there may be a large amount of control hardware 194 that may need to be written with the corrected values. Additionally, providing a mechanism for the microcode 122 to perform the EDAC greatly simplifies the state machine 199 relative to a solution in which the state machine 199 performed the EDAC or a solution in which EDAC is performed as the fuse values are loaded into the scan registers 191.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   a first plurality of fuses, a predetermined number of which are selectively blown, wherein control values are provided from the first plurality of fuses to circuits of the microprocessor to control operation of the microprocessor; and
   a second plurality of fuses, blown with a signature, wherein the signature specifies the predetermined number of the first plurality of fuses that are blown;
   wherein, in response to being reset, the microprocessor is configured to:
      read the first plurality of fuses and count a number of them that are blown;
      read the signature from the second plurality of fuses;
      compare the counted number with the signature read from the second plurality of fuses; and
      prevent fetching and executing user program instructions if the number counted from reading the first plurality of fuses does not equal the signature read from the second plurality of fuses.

2. The microprocessor of claim 1, wherein the first and second plurality of fuses are configured to be selectively blown during manufacture of the microprocessor.

3. The microprocessor of claim 1, wherein the second plurality of fuses are also blown with an error correction value for use in correcting an error in the signature read from the second plurality of fuses.

4. The microprocessor of claim 3, wherein the control values are provided from the first plurality of fuses directly to circuits of the microprocessor to control operation of the microprocessor without error correction.

5. The microprocessor of claim 4, wherein the second plurality of fuses are also blown with second control values, wherein the microprocessor is further configured to correct an error in the second control values read from the second plurality of fuses and to provide the corrected second control values to second circuits of the microprocessor to control operation of the microprocessor.

6. The microprocessor of claim 1, wherein the microprocessor is configured to report an error to system software if the number counted from reading the first plurality of fuses does not equal the signature read from the second plurality of fuses.

7. The microprocessor of claim 6, wherein the microprocessor is configured to report an error to system software if the number counted from reading the first plurality of fuses does not equal the signature read from the second plurality of fuses, rather than preventing fetching and executing user program instructions.

8. The microprocessor of claim 1, further comprising:
   microcode, configured to read the first plurality of fuses and count the number of them that are blown, read the signature from the second plurality of fuses, and compare the counted number with the signature read from the second plurality of fuses.

9. A method for operating a microprocessor, the method comprising:
- reading a first plurality of fuses, wherein a predetermined number of the first plurality of fuses are selectively blown, wherein control values are provided from the first plurality of fuses to circuits of the microprocessor to control operation of the microprocessor;
- counting a number of the first plurality of fuses that are blown;
- reading a signature from a second plurality of fuses, wherein the second plurality of fuses are blown with the signature, wherein the signature specifies the predetermined number of the first plurality of fuses that are blown;
- comparing the counted number with the signature read from the second plurality of fuses; and
- preventing the microprocessor from fetching and executing user program instructions if the number counted from reading the first plurality of fuses does not equal the signature read from the second plurality of fuses.

10. The method of claim 9, wherein the first and second plurality of fuses are configured to be selectively blown during manufacture of the microprocessor.

11. The method of claim 9, wherein the second plurality of fuses are also blown with an error correction value for use in correcting an error in the signature read from the second plurality of fuses.

12. The method of claim 11, further comprising:
- providing the control values from the first plurality of fuses directly to circuits of the microprocessor to control operation of the microprocessor without error correction.

13. The method of claim 12, wherein the second plurality of fuses are also blown with second control values, the method further comprising:
- correcting an error in the second control values read from the second plurality of fuses; and
- providing the corrected second control values to second circuits of the microprocessor to control operation of the microprocessor.

14. The method of claim 9, further comprising:
- reporting an error to system software if the number counted from reading the first plurality of fuses does not equal the signature read from the second plurality of fuses.

15. The method of claim 14, wherein said reporting an error to system software if the number counted from reading the first plurality of fuses does not equal the signature read from the second plurality of fuses is performed rather than said preventing the microprocessor from fetching and executing user program instructions.

16. The method of claim 9, wherein said reading a first plurality of fuses, said counting a number of the first plurality of fuses that are blown, said reading a signature from a second plurality of fuses, said comparing, and said preventing the microprocessor from fetching and executing user program instructions are performed by microcode of the microprocessor.

17. The method of claim 9, wherein said reading a first plurality of fuses, said counting a number of the first plurality of fuses that are blown, said reading a signature from a second plurality of fuses, said comparing, and said preventing the microprocessor from fetching and executing user program instructions are performed in response to the microprocessor being reset.

18. A method for manufacturing a microprocessor having a capability to detect an incorrect control value provided by a first plurality of fuses of the microprocessor to circuits of the microprocessor during operation of the microprocessor to control operation thereof, the control value being incorrect because a blown one or more of the first plurality of fuses is providing a non-blown value rather than a blown value, the method comprising:
- determining the control value;
- counting a number of the first plurality of fuses to be blown to create the control value in the first plurality of fuses;
- blowing the control value into the first plurality of fuses; and
- blowing into a second plurality of fuses of the microprocessor a signature, wherein the signature specifies the number of the first plurality of fuses blown to create the control value.

19. The method of claim 18, further comprising:
- computing an error correction value from the number, wherein the error correction value is for use in correcting an error in the number when subsequently reading the number from the second plurality of fuses; and
- blowing the error correction value into the second plurality of fuses.

20. A computer program product encoded in at least one computer readable medium for use with a computing device, the computer program product comprising:
- computer readable program code embodied in said medium, for specifying a microprocessor, the computer readable program code comprising:
  - first program code for specifying a first plurality of fuses, a predetermined number of which are selectively blown, wherein control values are provided from the first plurality of fuses to circuits of the microprocessor to control operation of the microprocessor; and
  - second program code for specifying a second plurality of fuses, blown with a signature, wherein the signature specifies the predetermined number of the first plurality of fuses that are blown;
- wherein, in response to being reset, the microprocessor is configured to:
  - read the first plurality of fuses and count a number of them that are blown;
  - read the signature from the second plurality of fuses;
  - compare the counted number with the signature read from the second plurality of fuses; and
  - prevent fetching and executing user program instructions if the number counted from reading the first plurality of fuses does not equal the signature read from the second plurality of fuses.

21. The computer program product of claim 20, wherein the at least one computer readable medium is selected from the set of a disk, tape, or other magnetic, optical, or electronic storage medium and a network, wire line, wireless or other communications medium.

* * * * *